United States Patent [19]

Pedersen et al.

[11] 3,910,566

[45] Oct. 7, 1975

[54] COIL SPRING DETENT ASSEMBLY

[75] Inventors: Carl O. Pedersen; Donald J. Parquet, both of Burlington, Iowa

[73] Assignee: J. I. Case Company, Racine, Wis.

[22] Filed: May 15, 1974

[21] Appl. No.: 470,124

[52] U.S. Cl. .................. 267/167; 267/615; 85/5 B; 285/276
[51] Int. Cl.² .......................................... F16F 1/12
[58] Field of Search ............. 267/615, 167; 74/503; 137/625.43; 85/5; 180/189; 251/297, 258; 285/276, 277, 316

[56] References Cited
UNITED STATES PATENTS

| 2,848,255 | 8/1958 | Klein et al. | 285/276 |
| 3,667,566 | 6/1972 | Hopkins | 85/5 B |
| 3,806,150 | 4/1974 | Peart et al. | 267/615 |

FOREIGN PATENTS OR APPLICATIONS

| 674,720 | 6/1952 | United Kingdom | 267/167 |

Primary Examiner—James B. Marbert
Attorney, Agent, or Firm—Arthur J. Hansmann

[57] ABSTRACT

A coil spring detent assembly comprising two members, each with a groove therein for alignment with each other, and a detent member disposed in the grooves for securing the members relative to each other. The detent member itself is a series of circular members strung onto a coil spring which yieldingly urges the circular members into their holding positions but which permits the circular members to move out of one of the grooves and thereby permit movement between the two members mentioned. The circular members are shown to be cylindrically shaped with a diameter substantially larger than the cross-sectional size of the coil spring which is strung within the circular members, and thus minimum marring and damage results when the two members move relative to each other.

7 Claims, 12 Drawing Figures

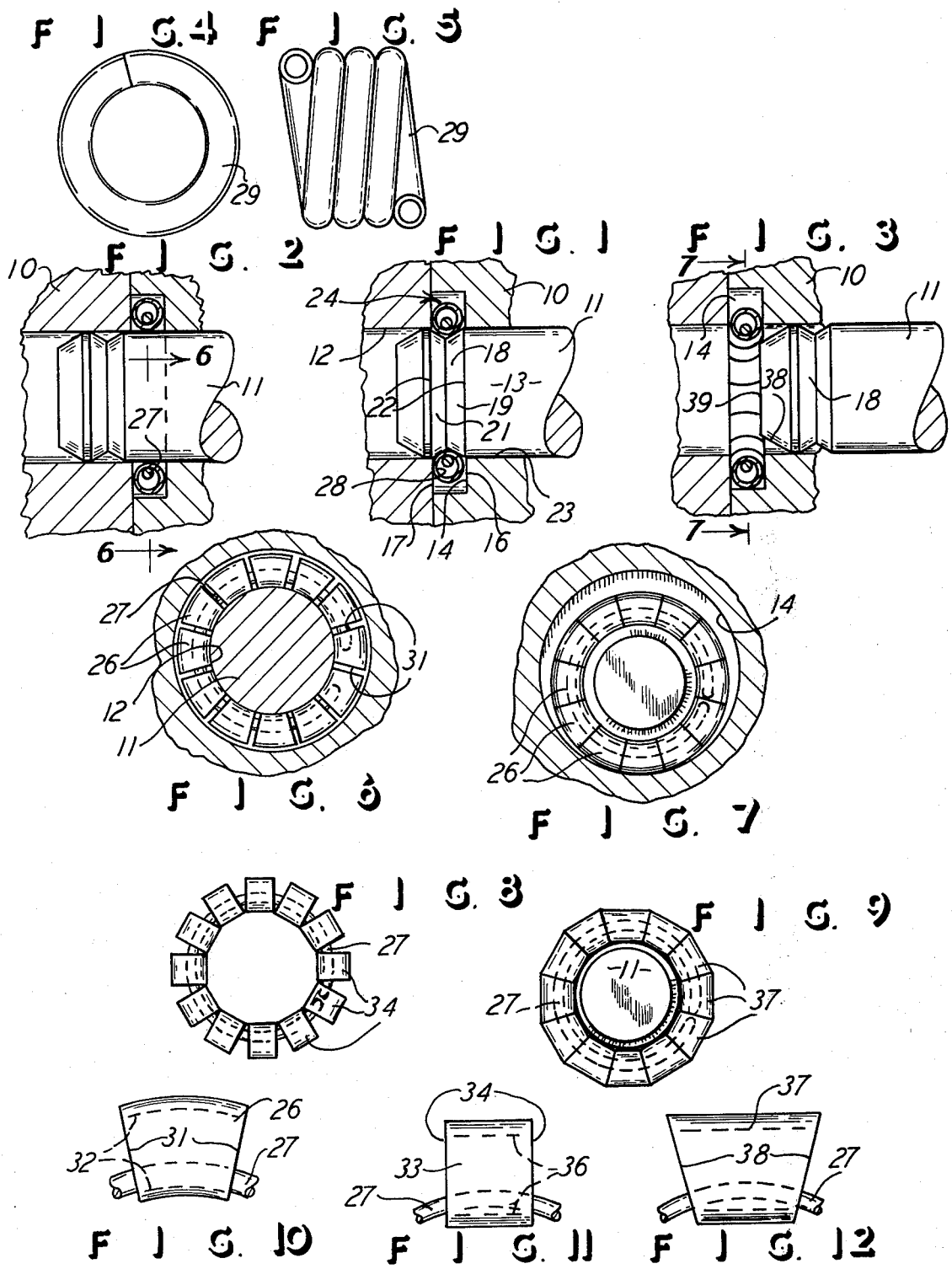

COIL SPRING DETENT ASSEMBLY

This invention relates to a coil spring detent assembly, and, more particularly, it relates to a detent assembly wherein the detent member is in the form of a coil spring and has circular members strung on the coil spring and thereby yieldingly urges the detent member into a groove on one of the two members being held together.

BACKGROUND OF THE INVENTION

Detent assemblies are already known in many different forms in the art. Some of these prior art forms include spring members such as the springs shown in U.S. Pat. Nos. 2,070,638 and 3,072,149 and 3,174,500 and 3,250,313. Further, U.S. Pat. Nos. 1,464,263 and 3,469,604 show resilient ring members which serve as detent members. Still further, U.S. Pat. No. 3,667,566 shows a resilient type of detent member which has ovoid-shaped members strung on a coiled spring for serving as a latch member. Further, it is also already known to have one loop of a coil spring, in the form of a snap ring, extend around one member and in the groove thereon to hold the member against a minimum force tending to unseat the member, and such arrangement would be akin to that shown in U.S. Pat. No. 1,464,263.

These prior art devices all differ from that disclosed in this document, and they are limited in their effect and in the desirability of the manner in which the assembly itself operates and is durable. That is, the detent members which are a single coil spring as described above commonly tend to damage the edges of the walls defining the grooves containing the spring, and sometimes the spring itself even tends to work its way between the two movable members to thereby damage the spring and/or the movable members. Also, the other prior art detent members mentioned above are arranged differently from the assembly described herein, and they do not have the durability and the holding capabilities of the assembly described herein.

Accordingly, it is a primary object of this invention to provide an improved coil spring detent assembly, and to particularly provide an assembly which is accurate and reliable in its holding function, and one which will not be self-damaging in the chipping or marring of the edges of the grooves confining the detent member itself. In accomplishing this and other objectives, it is also an advantage of the present assembly in that it can be provided in a simple structural form and is low in cost.

Accordingly, the coil spring detent assembly of this invention is arranged to be of a quality which has minimum wear or destructive characteristics in that it is provided with so-called protective members which are described and shown to be in the form of circular members which permit the expansion and contraction of detent member itself without damaging the members which are being confined by the detent member. In accomplishing this object, there is a coil spring which provides the holding characteristic of the detent member, and there are protective members surrounding the coil spring to protect the coil spring as well as the other parts of the assembly, so that the coil spring remains undamaged and will not wear out, and the protective members serve the desired function of providing adequate holding but yet will release for the relative movement when and as desired.

Other objects and advantages have become apparent upon reading the following description in light of the accompanying drawings.

BRIEF DESCRIPTION OF THE DRAWINGS

FIG. 1 is a sectional view through a preferred embodiment of this invention, and showing the assembly in the holding position.

FIGS. 2 and 3 are sectional views similar to FIG. 1, but showing the assembly in two different released positions.

FIGS. 4 and 5 are end elevational and side elevational views, respectively, of a coil of tubing material which may be used in forming the protective members shown in FIGS. 1, 2, and 3.

FIG. 6 is a sectional view taken on the line of 6—6 of FIG. 2.

FIG. 7 is a sectional view taken on the line 7—7 of FIG. 3.

FIGS. 8 and 9 are end elevational views of two other embodiments of the detent member itself.

FIG. 10 is an elevational view of one of the protective members shown in FIGS. 1 through 7, and on an enlarged scale.

FIG. 11 is an elevational view of one of the protective members shown in FIG. 8, but on an enlarged scale.

FIG. 12 is an elevational view of one of the protective members shown in FIG. 9, but on an enlarged scale.

DETAILED DESCRIPTION OF THE PREFERRED EMBODIMENTS

The drawings show a coil spring detent assembly which includes a first or housing member 10 and a second or rod member 11 which is movable in a cylindrical opening 12 in the member 10. That is, the movable member 11 is shown to be cylindrically-shaped and is snugly disposed in the cylindrical opening 12, and the member 10 is shown to be in two parts for presenting a continuous cylindrical opening 12, and the circumference 13 of the member 11 is in abutment with the wall defining the cylindrical opening 12 as shown. A circular groove 14 is in the member 10 and is defined by walls designated 16 and 17, and a matching circular groove 18 is in the member 11, and it is defined by the opposed walls designated 19 and 21, and thus the groove 18 is angulated or tapered in its side view shape shown. Therefore, the outer diameter of the groove 18, as defined by the circular lines designated 22, is the size of the inner diameter of the groove 14, as designated by the wall identified as 23 and which is circular and defines the cylindrical opening 12. Therefore, the two circular grooves 14 and 18 are shown aligned on the same plane and they mate with each other and present one circular enclosure which receives a detent member generally designated 24.

The member 24 consists of a plurality of circular members 26 and a single loop of a coil spring 27. That is, the circular members 26 are hollow or have interior openings 28 and they are strung on the coil spring 27 in end-to-end relation, as shown in FIGS. 6 and 7, for instance. The holes or openings 28 in the circular members 26 are at least twice the diameter of the cross-sectional size or cross-sectional diameter of the coil spring 27, and thus the coil spring 27 engages the portions of the circular members 26 which are adjacent the member 11 and therefore cause the circular members 26 to bear downwardly on the walls 19 and 21 or into the groove 18 of the member 11 and thereby restrain the member 11 from moving from the FIG. 1 position until a minimum force is applied to either the member 10 or 11 for the relative movement therebetween.

FIGS. 4 and 5 show a coil of tubing designated 29, and the cylindrically-shaped circular members 26 can be cut on radial cuts, as shown in FIGS. 6 and 7, from the coil 29 and thus be readily and inexpensively provided. That is, the opposite ends designated 31 of the circular members 26 can be cut radially relative to the center axis of the grooves 14 and 18 in the FIG. 1 assembled position, and thus the circular members 26 can be an end-to-end abutting contact in the FIG. 1 and FIG. 3 and FIG. 7 position, and thereby form one endless ring of members 26 and preclude moving out of groove 14 and limit radial collapse of the detent.

FIG. 10 shows an enlarged view of the circular member 26 and the coil spring 27, and it will here be seen that the opposite ends 31 are on the radial cut shown and described in connection with FIGS. 6 and 7. Further, it will be seen that the circular members 26 have the large holes for interior openings designated at 32 in FIG. 10, and then the smaller cross-sectional size coil spring 27 is shown to be of a circular cross section, though it may be of a rectagular shape too, but the holes 32 are at least twice the diametrical size compared to the cross-sectional size of the coil spring 27. Also, the outer circumference of the circular members 26, compared to the seated depth of the members 26 in the groove 18, is such that less than one-half of the overall size of the circular members 26 will enter the groove 18 in the FIG. 1 position, and therefore the member 11 can move away from the detent member 24 without damaging the edges 22 and the edges defining the groove 14, but still the full strength and resilience of the smaller-sized coil spring 27 is effective for holding the member 11 against the movement, as desired. That is, the inexpensive and commonly accepted arrangement of a single coil spring, such as the spring 27, is utilized in the detent member, but the advantage of the protective members 26 is also attained, as described.

FIGS. 8 and 11 further show that the circular members, in this instance designated 33, can be cut on parallel planes at their opposite ends, as designated at 34. Further, again the interior holes or openings of the circular members 33, as designated 36, is much larger than the cross-sectional size of the coil spring 27, and the circular members 26 and 33 are actually capable of rotating when a moving force is applied to the member 11 to cause it to move to either the FIG. 2 or FIG. 3 position.

Still further, FIGS. 9 and 12 show another embodiment or form of the circular members, and here they are designated 37 and are formed of the straight, rather than arcuate tubing used to form the members 26 as shown in FIG. 10, and also FIG. 12 shows the opposite ends 38 to be on radial cuts, rather than on parallel cuts or ends 34 as in FIG. 11. In the embodiments of FIGS. 10 and 12, the opposite ends 31 and 38, respectively, will be in abutment with adjacent ones of the circular members, and as such abutting relationship will tend to align the circular members in the positions shown in FIGS. 7 and 9, and thus maximum presentation of surface and exterior portions of the circular members 26 and 37 are presented to the respective grooves 14 and 18 for the holding force being described. However, the embodiment shown in FIGS. 8 and 11 renders the circular members more susceptible to rotation. In all embodiments, the sizes of the grooves and the circular members, and the arrangement of the coil spring 27, are such that the spring 27 will always resiliently urge the circular members inwardly into the groove 18, and thus the desired holding force is achieved. That is, the circular members, regardless of their shape, will not prevent the coil spring 27 from exerting a yielding spring force inwardly on the inner portions of the circular members in the holding position of FIG. 1. Also, with the circular members being at least twice the diametrical size of the groove 18, the release of the members 10 and 11 will be accomplished without damaging those parts, since the circular members will move out of the groove 18 without the damage which might be otherwise created due to Hertzian forces at the edges defining the grooves 14 and 18.

Thus the coil spring 27 extends for approximately one full circle, as shown in FIGS. 7, 8, and 9 positions, to have its opposite ends adjacent each other, in what is defined as a closed position, and the circular members are all fully controlled and restrained by the coil spring 27, and the axial lengths of each of the various circular members 26, 33, and 37 are greater than any gap between the ends of the coil spring 27, so the circular member cannot become unstrung from the coil spring 27. Also, the circular members actually have a cylindrical shape of an outer diametrical size at least twice the size of the thickness of the coil spring 27 which serves as the energy device in the detent member itself.

The drawings further show that the members 10 and 11 can move relative to each other in either direction from FIG. 1, as seen in one direction in FIG. 2 and in the opposite direction in FIG. 3. In the FIG. 3 position, the circular members 26 are shown to be forming their most compact circle and are in abutment with each other and are therefore still under the control of the walls 16 and 17 which define the groove 14, and the member 11 has a conical end designated 38 with the very end portion 39 being of a diameter smaller than the inner diameter of the circularly disposed circular members 26, for penetrating the members 26 when the member 11 moves to the left from the FIG. 3 position.

What is claimed is:

1. A coil spring detent assembly comprising a first member having a cylindrically-shaped wall extending thereon and defining a cylindrical opening in said first member, said first member having oppositely faced circular walls defining an endless circular first groove in said cylindrically-shaped wall and encircling said cylindrical opening, a cylindrically-shaped second member extending snugly into said cylindrical opening and having oppositely-faced circular walls defining a circular second groove extending endlessly around said second member and having an outer diameter the size of the inner diameter of said first groove for matching alignment of said grooves together on the same plane and form one enclosed annular opening, said members being movable relative to each other for movement of said grooves to positions into and out of alignment with each other relative to the plane along each of said grooves, a plurality of non-elastic, rigid circular members disposed in end-to-end arrangement in said second groove and extending into said first groove for restricting said movement of said first and said second members relative to each other by abutting the said walls defining the respective said grooves, said circular members having holes extending therethrough in the direction of their end-to-end alignment, and a coil spring of a single circular loop of spring material, and with said coil spring being of a coil diametrical size and resilience to be disposed radially inwardly to a position of abutting the said circular members at their interior portions which define said holes in said circular members and to thereby be eccentric relative to said circular members and yieldingly urge said circular members into said second groove and with said coil spring having opposite ends disposed adjacent each other in a closed position, the cross-sectional size of said holes of said circular members being at least twice the cross-sectional size of said coil spring and the cross-sectional size of said circular members being at least twice the dimension of the fully seated depth of said circular members in said second groove for projection of more than one-half of the circular configuration of said circular members from said second groove for reliable release of said circular members from said second groove and to assure said relative movement of said first and said second members and of said circular members relative to each other and relative to said coil spring, and said coil spring and said circular members being respectively dimensioned and arranged to have said circular members in end-to-end abutting disposition to limit radially inward collapse of said detent when said second member is removed therefrom and with the outer diameter of the collapsed said circular members being greater than the inner diameter of said first groove to thereby always remain in said first groove.

2. The coil spring detent assembly as claimed in claim 1, wherein said circular members are cylindrically shaped and are curved axially along an arc to conform to the circular shape of said grooves.

3. The coil spring detent assembly as claimed in claim 2, wherein said circular members have their opposite ends disposed on planes which are radial relative to the center axis of said grooves.

4. The coil spring detent assembly as claimed in claim 1, wherein said circular members are cylindrically shaped and have their opposite ends disposed on planes which are parallel to each other.

5. The coil spring detent assembly as claimed in claim 1, wherein said circular members are cylindrically shaped and have their opposite ends disposed on planes which are radial relative to the center axis of said grooves.

6. The coil spring detent assembly as claimed in claim 1, wherein said coil spring is of a circular length, and said circular members are of a size, all to have said coil spring extend for approximately one full circle.

7. The coil spring detent assembly as claimed in claim 1, wherein said circular members are sufficient in size and number to be in their end-to-end abutting relation and be disposed in one endless circle when said second member is moved away from said circular members, and the end of said second member being tapered and with the smaller diameter of the taper being less than the inner diameter of said endless circle, whereby said tapered end can penetrate said endless circle.

* * * * *